US006359975B1

(12) United States Patent
Cai

(10) Patent No.: US 6,359,975 B1
(45) Date of Patent: Mar. 19, 2002

(54) INTELLIGENT-NETWORKED TELECOMMUNICATION SYSTEM WHICH STRATEGICALLY CREATES AND EMPLOYS SERVICE-DEPENDENT PSEUDO CALLING LINE IDENTITIES TO ELIMINATE REDUNDANT BILLING ERRORS

(75) Inventor: Yigang Cai, Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/527,269

(22) Filed: Mar. 17, 2000

(51) Int. Cl.[7] ............................................. H04M 15/00
(52) U.S. Cl. .............. 379/114.04; 379/111; 379/112.01; 379/114.01
(58) Field of Search ........................... 379/111, 112.01, 379/112.07, 114.01, 114.03, 114.04, 114.15, 114.28, 115.01, 126, 127.01, 127.02, 133, 207.14, 207.15; 455/405, 406, 408

(56) References Cited

U.S. PATENT DOCUMENTS

| | | | | |
|---|---|---|---|---|
| 3,739,097 A | * | 6/1973 | Leyburn et al. ............ | 379/114 |
| 5,822,414 A | * | 10/1998 | Reding et al. .............. | 379/114 |
| 5,923,740 A | * | 7/1999 | Ito et al. .................... | 379/112 |
| 5,987,118 A | * | 11/1999 | Dickerman et al. ......... | 379/265 |

* cited by examiner

Primary Examiner—Curtis Kuntz
Assistant Examiner—Quoc D. Tran
(74) Attorney, Agent, or Firm—Gregory P. Gadson

(57) ABSTRACT

An intelligent-networked telecommunication system avoids redundant billing for telephone transactions in which there is a billing conflict between the Intelligent Network (IN) and another component of the system by its Service Control Point (SCP) creating a service-dependent pseudo Calling Line Identifier (CLI). When a Pseudo CLI look-up table stored in the SCP database indicates that a pseudo CLI is to be created (based upon the Destination Number, DN, or the Service Key, SK), the SCP combines a prefix listed in the table with the Calling Party Number (CgPN) to form a pseudo CLI or create a totally new CLI number string. When the call is connected to the DN, the created pseudo CLI, rather than the original CLI, is transferred to the DN. A pseudo CLI is indicated where the IN is programmed to handle the billing of a particular transaction, and where the instrumentality of the DN (e.g., toll switch or special service platform) is also set up to handle billing. When the toll switch, special service platform, etc., attempts to bill for the transaction (already being billed by the IN) the pseudo CLI prevents it from billing an actual customer since no actual customer will have any of the pseudo CLIs. The service-dependent CLI also indicates to the toll switch, or special service platform, etc., that the current IN service call has already been billed through the IN.

36 Claims, 2 Drawing Sheets

Figure 1:
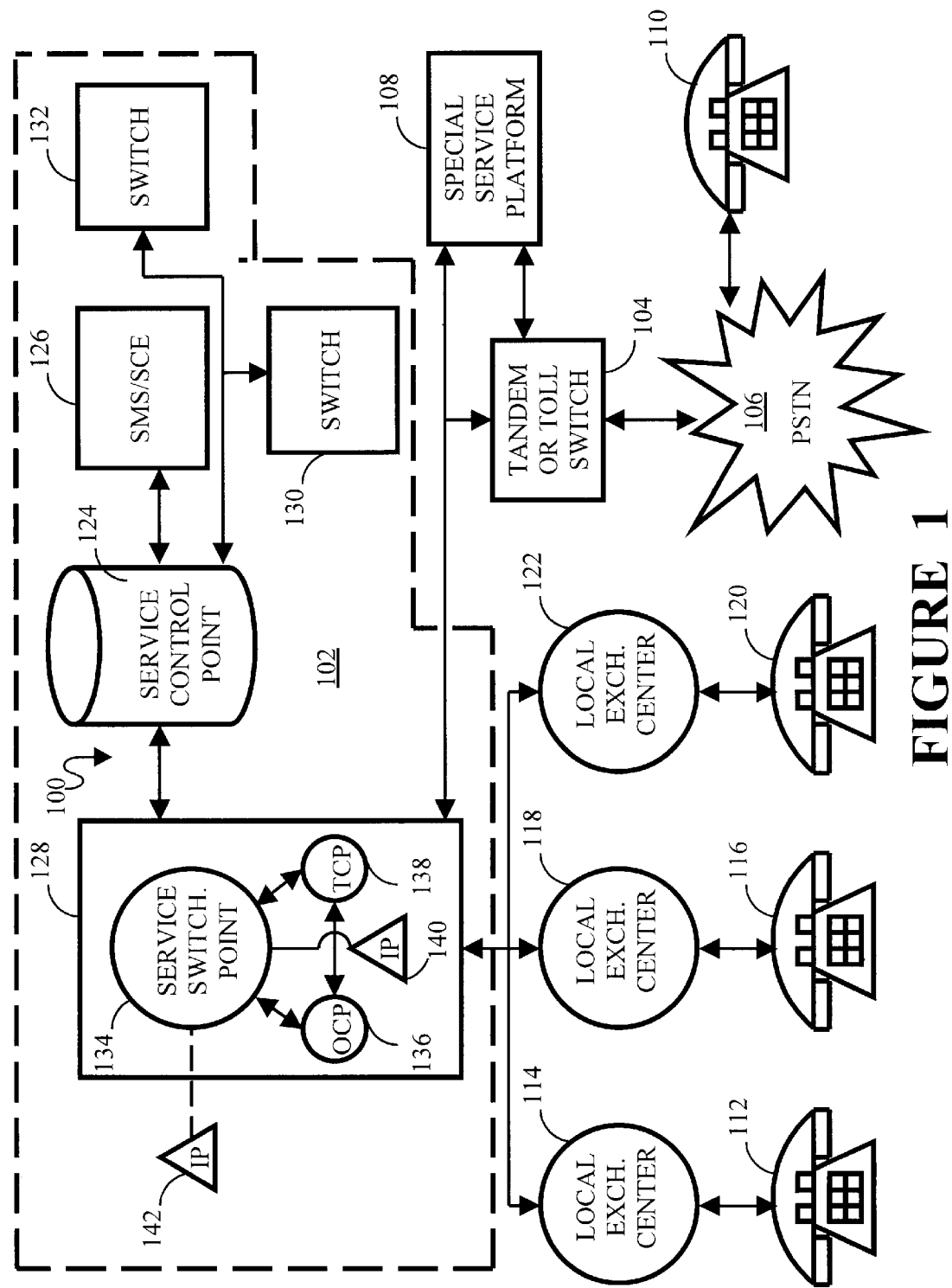

INTELLIGENT-NETWORKED TELECOMMUNICATION SYSTEM WHICH STRATEGICALLY CREATES AND EMPLOYS SERVICE-DEPENDENT PSEUDO CALLING LINE IDENTITIES TO ELIMINATE REDUNDANT BILLING ERRORS

BACKGROUND OF THE INVENTION

1. Field of the Invention

The present invention generally relates to intelligent-networked telecommunication systems for providing telephone services. More particularly, the present invention relates to the aforementioned networks as relates to the administration of billing for toll calls, telephone calls to special services, and other situations in which billing can be potentially handled by more than one component of the system.

2. Background

Intelligent Networks (INs) are used in telecommunication systems, such as Public Switched Telephone Networks (PSTNs), for the automated processing of telephone calls. In the typical IN architecture, a central computer called a Service Control Point (SCP) stores logic and data to direct telephone services and telephone calls through the network. Several switches used to perform switching of calls in the IN communicate with the SCP using standard messaging protocols such as the International Telecommunications Union (ITU) Intelligent Network Application Part (INAP), or the European Telecommunication Standards Institute (ETSI) INAP. Typically, the aforementioned switches each contain a Service Switching Point (SSP) for controlling call routing, an Originating Call Processor (OCP) for initially handling calls routed to the switch, and a Terminating Call Processor (TCP) for terminating calls to a destination. Used in this specification, the terms "termination" and "terminating" refer to connecting a call to a destination number.

The switches may also include, or have connected thereto, one or more Intelligent Peripherals (LPs) used to interface between customers and the IN in order to make the system user-friendly. IPs may contain announcement devices, text-to-voice converters, and decoders for decoding Dual-Tone-Multi-Frequency (DTMF) signals generated by the alphanumeric keypads of a customer's telephone or other telephonic device, or other devices.

As is known in the art, customers can be connected to the IN via Local Exchange Carriers or Local Exchange Centers (LECs).

The software of the IN can be modified to change or eliminate existing services, or introduce new services via a Service Creation Environment (SCE). A related Service Management System (SMS) allows customers to establish or modify their telephone service via several communication avenues, including telephone calls to an automated menu, a conversation with a telephone operator, and by using the Internet.

Communication between the various components of the IN (i.e., queries, responses, and the like) can be carried out using Common Channel Signaling (CCS) or packet switching such as the ITU's System Number 7 (S7).

Calling Line Identifiers (also known as Calling Line Identities or Calling Line Identifications) are used to indicate the telephone line/wire or group trunk of an origination telephone call. Important uses of Calling Line Identifiers (CLIs) include Caller Identification (Caller ID), and telephone billing administration.

Prior art INs often designate certain customer transactions for which the IN will handle billing, rather than other components of a general telecommunication system. For example, INs capable of processing telephone calling card transactions are set up to handle the billing as well. In current telecommunication systems, the billing for telephone transactions such as toll calls, and calls to Special Service platforms is handled by the component performing the service or connection. The CLI of the originating telephone party is used to identify the financially responsible customer.

When a telephone customer requests, and is connected to a Special Service, the Special Service platform uses the received original CLI to bill for the service. A wide variety of special services includes information checking, general consulting, weather reporting, time and temperature announcing, and directory assistance.

When a telephone call reaches the tandem or toll switch, the tandem or toll switch uses the received original CLI or a pseudo CLI created by the upstream switch Originating Call Processor (OCP) when the original CLI is not available to bill for a long distance call or other services.

Because prior art telecommunication systems are automatically set up to have a component providing a service also handle billing, and because INs are set up to handle the billing of certain transactions, a billing conflict sometimes exists, leading to double (or redundant) billing for the same telephone transaction. For example, the IN bills a calling card customer's calling card account when that customer dials a special service or a long distance number. The special service platform may also bill the call to the account associated with the CLI of the telephone line from which the call was placed, resulting in a double billing. The tandem or toll switch may also bill the long distance call to the account associated with the CLI of the telephone line from which the call was placed, resulting in a double billing even though the IN has already billed for the long distance call.

Some prior art solutions to avoid the aforementioned double billing situations exist on the switch OCP side of a telephone system. However, those solutions have no controls implemented from the IN side of the telephone system, and are not service-dependent.

There is a great and unmet (by the prior art) need to avoid service-dependent redundant billing situations due to the aforementioned confused CLI problem in intelligent-networked telecommunication systems.

SUMMARY OF THE INVENTION

In view of the aforementioned problems and deficiencies of the prior art, the present invention provides, in an intelligent-networked telecommunication system, a method of avoiding redundant billing between an intelligent network (IN) and another component of the system where a billing conflict exists due to a confused CLI problem. The method at least includes the steps of providing a plurality of telephonic devices for initiating and receiving telephone calls, and providing an automated IN for the automatic processing of telephone calls in the telecommunication system, the IN at least including a service control point (SCP) at least including control logic and an SCP database, and the IN at least including a plurality of switches coupled to telephone devices.

The method also includes the steps of, via the switches, routing calls authorized by the SCP to a destination number specified by a calling party, designating the IN as handling billing for a telephone transaction, and via the SCP, strategically creating and substituting for an original Calling Line Identifier (CLI), a pseudo CLI when the destination number (DN) or service key (SK) indicates from the SCP database, that a billing conflict exists between the IN and another component of the system. The method additionally transfers a telephone call to the DN with the pseudo CLI instead of the original CLI.

The present invention also provides an intelligent-networked telecommunication system adapted to avoid redundant billing between an IN and another component of the system where a billing conflict exists due to a confused CLI problem. The system at least includes a plurality of telephonic devices adapted to initiate and receive telephone calls, and an automated IN adapted to automatically process telephone calls in the telecommunication system, the IN at least including an SCP at least including control logic and an SCP database, and the IN at least including a plurality of switches coupled to telephone devices.

The switches are adapted to route calls authorized by the SCP to a destination number specified by a calling party. The SCP is adapted to strategically create and substitute for an original CLI, a pseudo CLI when the DN or SK indicates from the SCP database, that a billing conflict exists between the IN and another component of the system. The SCP is further adapted to transfer a telephone call to the DN with the pseudo CLI instead of the original CLI.

BRIEF DESCRIPTION OF THE DRAWING FIGURES

Figure 2:
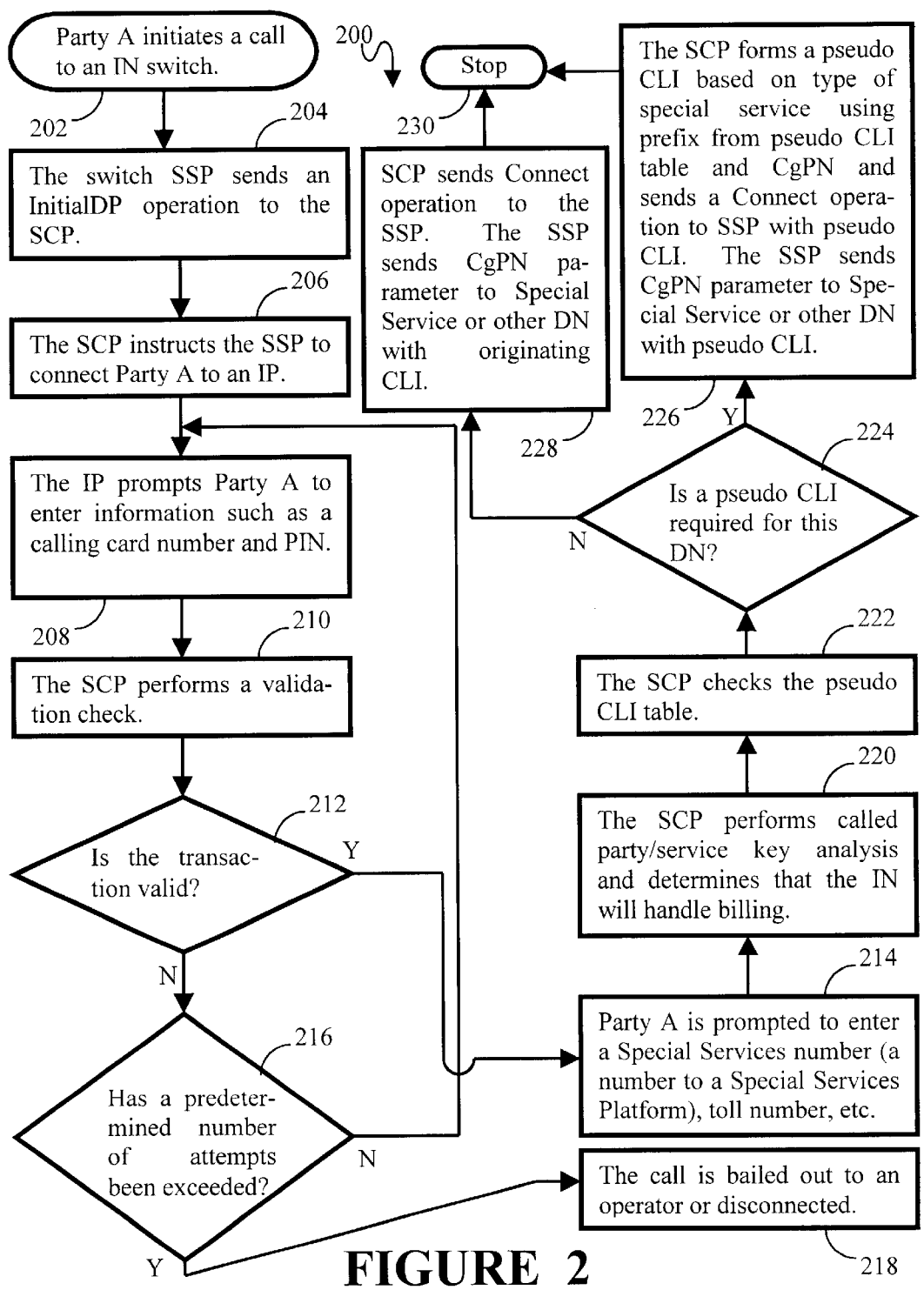

Features and advantages of the present invention will become apparent to those skilled in the art from the description below, with reference to the following drawing figures, in which:

FIG. 1 is a schematic block diagram of the basic hardware for the present-inventive intelligent-networked telecommunication system for creating and employing pseudo CLIs for redundant billing avoidance; and FIG. 2 is a flowchart/algorithm detailing the handling of a telephone calling card call in which a billing conflict between the IN and another component of the telecommunication system exists.

DESCRIPTION OF THE PREFERRED EMBODIMENTS

The basic hardware of the present-inventive telecommunication system 100 is illustrated in FIG. 1. The telecommunication system 100 contains an Intelligent Network (IN) 102 nominally including a Service Control Point (SCP) 124, a Service Management System/Service Creation Environment (SMS/SCE) 126, and several switches such as the ones 128, 130 and 132. It will be appreciated by those skilled in the art that the SCP 124 can be implemented as a networked database, not limited to one geographic location.

The switches include a Service Switching Point (SSP) such as the one 134, an Originating Call Processor (OCP) and Terminating Call Processor (TCP), 136 and 138, respectively. The switches also have associated Intelligent Peripherals (IPs) for the purpose of playing announcement messages and prompting and collecting user information. The IPs can be stand-alone units (142), or units integrated (140) within the associated switch, or a unit within the Service Node (SN) (not shown in FIG. 1).

The system 100 allows numerous calling parties such as the ones represented by the telephones 112, 116 and 120 in FIG. 1 to place and receive telephone calls. As is known in the art, the calling parties can connect to the IN 102 via Local Exchange Centers (LECs) such as the ones 114, 118 and 122 in FIG. 1.

A Special Service Platform 108 can be connected to the switch 134, or through a tandem or toll switch 104.

The tandem or toll switch 104 connects the IN 102 and telephone calls processed through the IN to other components of the system 100, such as a Public Switched Telephone Network (PSTN) 106, or the Special Service Platform 108. Destination parties such as that represented by the telephonic device 110 in FIG. 1 can receive telephone calls processed by the IN 102 via the switch 104 and PSTN 106.

The functionality of the components of the telecommunication system 100 mirrors the description in the "Background" section, supra. Additional novel features of the telecommunication system 100 are described below.

The SCP database (not shown) stores an extensive Pseudo CLI Table indicating by Destination Number (DN) and/or Service Key (SK), whether a Pseudo CLI is needed for completing a telephone call without redundant billing. The service key is a code designating the type of telephone service based on the dialed number or access code. The Pseudo CLI Table stored in the SCP database is determined and provisioned by the network operator based upon service and billing needs. The creation of pseudo CLIs is service dependent, and is completely independent of the switch and/or call processing. The Pseudo CLI Table is accessible to, and can be revised by the network operator via the SMS.

In the present-inventive system 100, the SMS provisions and creates a Pseudo CLI, and stores it in the SCP database when the billing for a telephone transaction is to be handled by the IN, and the telephone call is directed to an instrumentality which would normally also handle billing administration. For example, when a prepaid telephone calling card customer dials an access code to connect to the IN, the IN is programmed to handle billing administration. If the calling card customer enters a DN that corresponds to a toll call, or connection to a Special Service platform, a billing conflict may exist between the IN and another component of the system.

In these situations, the SCP uses a prefix associated with the type of service rendered by the Destination Number (in the Pseudo CLI look-Up Table), and combines the prefix with part or all of the Calling Party Number (CgPN) to form the pseudo CLI, or even a totally new CLI number string, and sends it to the SSP within the calling party number parameter of a "Connect" operation. When the IN connects the telephone call to the Special Service platform or toll switch, the SSP replaces the originally received CLI with the pseudo CLI, stores the pseudo CLI in the call record, and maps it to outgoing signaling.

A component of the system such as a Special Service Platform 108 or tandem/toll switch 104 attempting to bill for the call in the above example will not be able to charge to any customer, since the pseudo CLI will not be associated with any customer. This avoids the double billing tendencies associated with prior art intelligent-networked telecommunication systems. Additionally, since the pseudo CLI created by the IN is service-dependent, the special service platform or tandem/toll switch can identify the service from the purposefully provisioned pseudo CLI, and purposefully avoid double billing.

The algorithm 200 in FIG. 2 describes the system's handling of a telephone calling card call where a conflict in billing exists between the IN 102 and another component (e.g., Special Service Platform 108, or tandem/toll switch 104) of the system 100. The algorithm 200 is triggered when a calling card customer ("Party A") initiates a call to an IN switch (Step 202). The switch SSP sends an InitialDP operation to the SCP in Step 204.

In response to the InitialDP operation, the SCP instructs the SSP to connect Party A to an Intelligent Peripheral (IP) in Step 206. The IP prompts Party A to enter information such as the calling card number and a Personal Identification Number (PIN) as is known in the art (Step 208). The SCP performs a validation check to determine whether the transaction is authorized by comparing the PIN entered by Party A to the PIN stored in the SCP database for the calling card in question (Step 210).

If the transaction is valid, Party A is prompted to enter the Destination Number, which in the example, corresponds to a Special Service Platform or a toll call (Steps 212 and 214). If the transaction is not valid, the calling party is given additional attempts to enter a valid calling card number and PIN (Steps 212 and 216). In the preferred embodiment, the call is bailed out to an Operator Service Position System (OSPS) for operator assistance (Step 218) after a predetermined number of failed attempts.

In Step 220 the SCP analyzes service key information to decide that the IN will handle billing for the call. The SCP then checks the Pseudo CLI Table to ascertain (based upon the type of service requested as evidenced by the destination number (DN)) whether the telephone call will require a pseudo CLI (Steps 222 and 224). In this case, only the DN is important in creating the pseudo CLI, as the service key (SK) may not be needed. If a pseudo CLI is not required, the SCP instructs (via a Connect operation) the SSP to send the originating CLI to the special service or other DN in a Calling Party parameter included in the Connect operation (Step 228).

When a pseudo CLI is indicated, however, the SCP forms a pseudo CLI based upon: either (1) a prefix (related to the particular service sought) in the Pseudo CLI look-up table, and the Calling Party Number (CgPN); or (2) a totally new number string in the Pseudo CLI Look Up Table. The SCP sends a Connect operation to an SSP including the pseudo CLI in the calling party number parameter, to instruct the SSP to connect the calling party to the special service or tandem/toll switch (Step 226).

After performing either Step 226 or Step 228, the algorithm stops (Step 230), until another telephone call is received.

Table 1 illustrates an example of a Pseudo CLI Look Up Table suitable for use with the present invention. From the table, a pseudo CLI can constructed or obtained when the service key or destination number require this action, as explained above.

TABLE 1

Sample Pseudo CLI Look Up Table

| No. | Service Key | Destination Number | Pseudo CLI Prefix | Pseudo CLI | Function Flag |
|---|---|---|---|---|---|
| 1 | CC | 630-979-1234 | N/A | 3000000000 | On |
| 2 | VPN | N/A | N/A | 6000000000 | On |
| 3 | FPH | N/A | N/A | 8000000000 | On |
| 4 | PPCC | 630-713-2345 | 200 | N/A | Off |
| 5 | PPCC | 501-255-1234 | 200 | N/A | On |
| 6 | PPCC | 168 | 200 | N/A | On |
| 7 | — | — | — | — | — |

N/A — Not applicable

Explanations:
1. Function Flag—service logic determines whether the SCP shall provide the Pseudo CLI in the calling party number parameter in the Connect operation. If the flag is on, the Pseudo CLI will be created; otherwise the original CLI will be sent out in the Connect operation.
2. Pseudo CLI Prefix—if this applies, the Pseudo CLI will be formed with Prefix + original CLI. For example, if the original CLI is 630-244-1234, and the Prefix is 200, then the Pseudo CLI is 2006302441234.
3. Pseudo CLI—if this applies, the Pseudo CLI is a whole number string in this field, such as 3000000000 for a Calling Card Call (CC), 6000000000 for a VPN and 8000000000 for a Free Phone.
4. The service logic will check either the Service Key or the destination number in this look-up table to determine the Pseudo CLI. For example, in cases of No. 1, 2 and 3, only the SK is checked; and in cases 4, 5 and 6, the destination number is checked.
5. The destination number could be local (case 4), long distance (case 5), or special service platform (case 6).
6. If no entry is found in the table, the SCP service logic has the option of sending the original CLI in the calling party number parameter in Connect operation, or ignoring the calling party number parameter in the Connect operation.

Variations and modifications of the present invention are possible, given the above description. However, all variations and modifications which are obvious to those skilled in the art to which the present invention pertains are considered to be within the scope of the protection granted by this Letters Patent.

What is claimed is:

1. In an intelligent-networked telecommunication system, a method of avoiding redundant billing between an intelligent network (IN) and another component of the system where a billing conflict exists, said method comprising the steps of:

providing a plurality of telephonic devices for initiating and receiving telephone calls;

providing an automated IN for the automatic processing of telephone calls in said telecommunication system, said IN comprising a service control point (SCP) comprising control logic and an SCP database, and said IN comprising a plurality of switches coupled to telephone devices;

via said switches, routing calls authorized by said SCP to a destination number specified by a calling party;

designating said IN as handling billing for a telephone transaction;

via said SCP, creating and substituting for an original Calling Line Identifier (CLI), a pseudo CLI when the destination number (DN) or service key (SK) indicates from the SCP database, that a billing conflict exists between said IN and another component of said system; and transferring a telephone call to the DN with the pseudo CLI instead of the original CLI.

2. The method in claim 1, wherein said creating and substituting step further comprises checking a pseudo CLI look-up table to determine the existence of a billing conflict.

3. The method in claim 1, wherein said creating and substituting step further comprises checking a pseudo CLI look-up table to create said pseudo CLI using a prefix from said CLI look-up table, and at least a portion of the Calling Party Number.

4. The method in claim 1, wherein said DN designates a Special Services platform.

5. The method in claim 1, wherein said DN is connected to said system via a toll switch.

6. The method in claim 1, wherein said switches comprise a Service Switching Point (SSP).

7. The method in claim 6, wherein said creating and substituting step further comprises checking a pseudo CLI look-up table to determine the existence of a billing conflict.

8. The method in claim 6, wherein said creating and substituting step further comprises checking a pseudo CLI look-up table to create said pseudo CLI using a prefix from said CLI look-up table, and at least a portion of the Calling Party Number.

9. The method in claim 6, wherein said DN designates a Special Services platform.

10. The method in claim 6, wherein said DN is connected to said system via a toll switch.

11. The method in claim 1, wherein said creating and substituting step further comprises selecting a new CLI from a pseudo CLI look-up table.

12. The method in claim 6, wherein said creating and substituting step further comprises selecting a new CLI from a pseudo CLI look-up table.

13. An intelligent-networked telecommunication system adapted to avoid redundant billing between an intelligent network (IN) and another component of the system where a billing conflict exists, said system comprising:

a plurality of telephonic devices adapted to initiate and receive telephone calls; and an automated IN adapted to automatically process telephone calls in said telecommunication system, said IN comprising a service control point (SCP) comprising control logic and an SCP database, and said IN comprising a plurality of switches coupled to telephone devices;

wherein said switches are adapted to route calls authorized by said SCP to a destination number specified by a calling party;

wherein said SCP is adapted to create and substitute for an original Calling Line Identifier (CLI), a pseudo CLI when the destination number (DN) or service key (SK) indicates from the SCP database, that a billing conflict exists between said IN and another component of said system; and wherein said SCP is adapted to transfer a telephone call to the DN with the pseudo CLI instead of the original CLI.

14. The system in claim 13, further comprising a pseudo CLI look-up table, and wherein said SCP is farther adapted to check said pseudo CLI look-up table to determine the existence of a billing conflict.

15. The system in claim 13, further comprising a pseudo CLI look-up table, and wherein said SCP is further adapted to check said pseudo CLI look-up table to create said pseudo CLI using a prefix from said CLI look-up table, and at least a portion of the Calling Party Number.

16. The system in claim 13, wherein said DN designates a Special Services platform.

17. The system in claim 13, wherein said DN is connected to said system via a toll switch.

18. The system in claim 13, wherein said switches comprise a Service Switching Point (SSP).

19. The system in claim 18, further comprising a pseudo CLI look-up table, and wherein said SCP is further adapted to check said pseudo CLI look-up table to determine the existence of a billing conflict.

20. The system in claim 18, further comprising a pseudo CLI look-up table, and wherein said SCP is further adapted to check said pseudo CLI look-up table to create said pseudo CLI using a prefix from said CLI look-up table, and at least a portion of the Calling Party Number.

21. The system in claim 18, wherein said DN designates a Special Services platform.

22. The system in claim 18, wherein said DN is connected to said system via a toll switch.

23. The system in claim 13, further comprising a pseudo CLI look-up table, and wherein said SCP is further adapted to select a new CLI from said pseudo CLI look-up table.

24. The system in claim 18, further comprising a pseudo CLI look-up table, and wherein said SCP is further adapted to select a new CLI from said pseudo CLI look-up table.

25. In an intelligent-networked telecommunication system, a method of avoiding redundant billing between an intelligent network (IN) and another component of the system where a billing conflict exists, said method comprising the steps of:

providing an automated IN for the automatic processing of telephone calls in said telecommunication system;

via switches subsumed by said IN, routing calls authorized by said IN to a destination number specified by a calling party;

designating said IN as handling billing for a telephone transaction;

via said IN, creating and substituting for an original Calling Line Identifier (CLI), a pseudo CLI when the destination number (DN) or service key (SK) indicates that a billing conflict exists between said IN and another component of said system; and transferring a telephone call to the DN with the pseudo CLI instead of the original CLI.

26. The method in claim 25, wherein said creating and substituting step further comprises checking a pseudo CLI look-up table to determine the existence of a billing conflict.

27. The method in claim 25, wherein said creating and substituting step further comprises checking a pseudo CLI look-up table to create said pseudo CLI using a prefix from said CLI look-up table, and at least a portion of the Calling Party Number.

28. The method in claim 25, wherein said DN designates a Special Services platform.

29. The method in claim 25, wherein said DN is connected to said system via a toll switch.

30. The method in claim 25, wherein said switches comprise a Service Switching Point (SSP).

31. The method in claim 30, wherein said creating and substituting step further comprises checking a pseudo CLI look-up table to determine the existence of a billing conflict.

32. The method in claim 30, wherein said creating and substituting step further comprises checking a pseudo CLI look-up table to create said pseudo CLI using a prefix from said CLI look-up table, and at least a portion of the Calling Party Number.

33. The method in claim 30, wherein said DN designates a Special Services platform.

34. The method in claim 30, wherein said DN is connected to said system via a toll switch.

35. The method in claim 25, wherein said creating and substituting step further comprises selecting a new CLI from a pseudo CLI look-up table.

36. The method in claim 30, wherein said creating and substituting step further comprises selecting a new CLI from a pseudo CLI look-up table.

* * * * *